April 26, 1949.
O. A. BARTHOLOMEW
2,468,158
AUTOMATIC STEERING MECHANISM FOR
TROLLEY COACHES AND THE LIKE
Filed Aug. 27, 1945
2 Sheets-Sheet 1
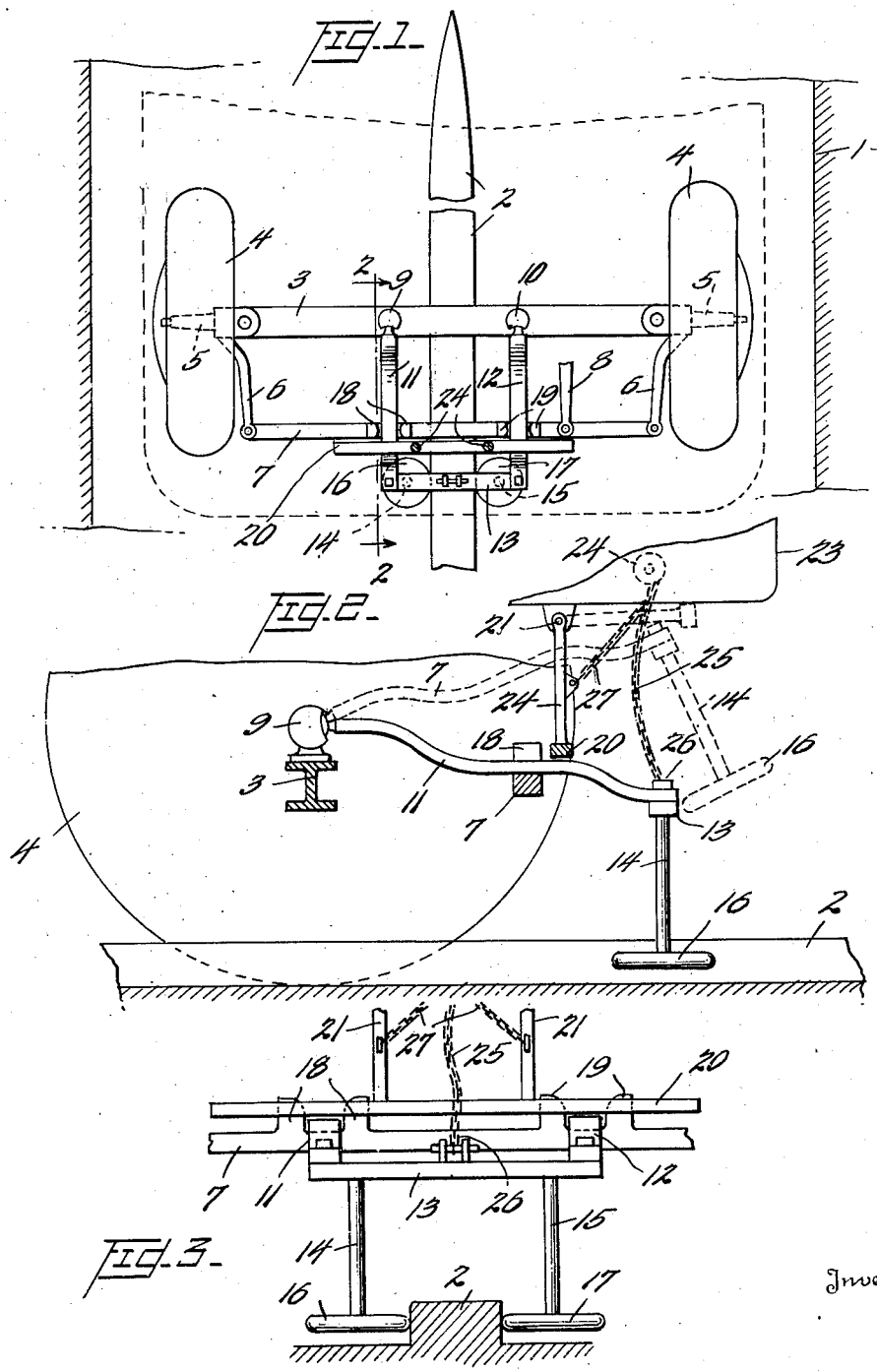
Inventor
Orlo A. Bartholomew,
By Parker Cook Attorney April 26, 1949.  O. A. BARTHOLOMEW  2,468,158
AUTOMATIC STEERING MECHANISM FOR
TROLLEY COACHES AND THE LIKE
Filed Aug. 27, 1945  2 Sheets-Sheet 2
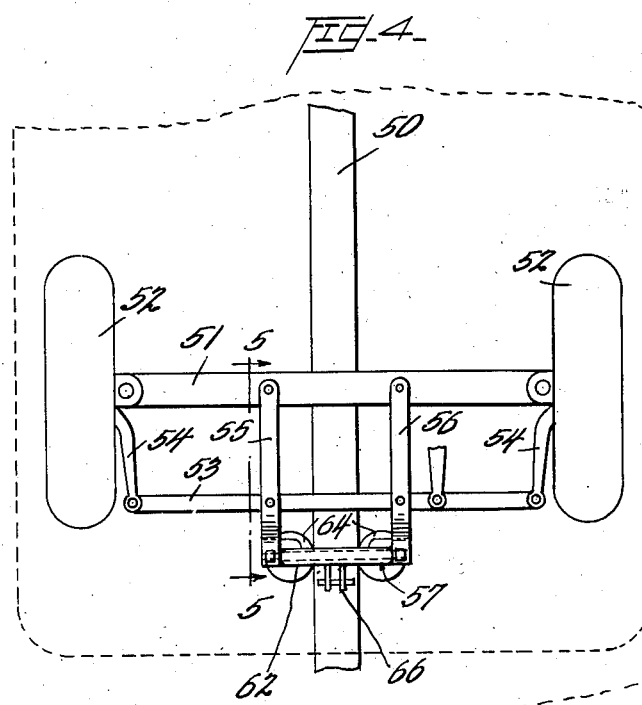
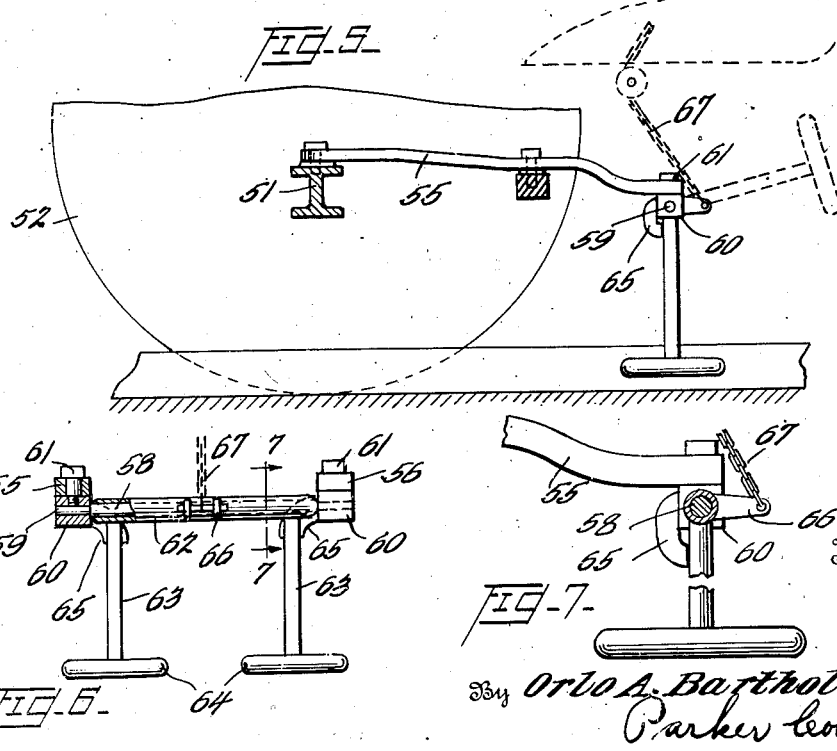
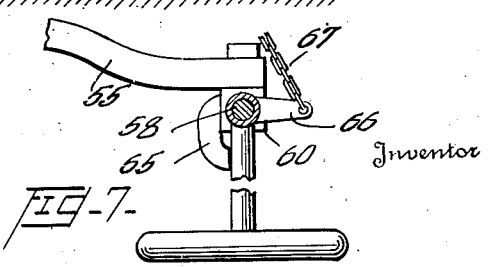
Inventor
Orlo A. Bartholomew,
Parker Cook Attorney Patented Apr. 26, 1949

2,468,158

UNITED STATES PATENT OFFICE 2,468,158

AUTOMATIC STEERING MECHANISM FOR TROLLEY COACHES AND THE LIKE

Orlo A. Bartholomew, Atlantic City, N. J.

Application August 27, 1945, Serial No. 612,808

3 Claims. (Cl. 104—247)

My invention relates to new and useful improvements in steering mechanisms for trolley coaches, buses and the like and more particularly to an automatic steering mechanism so that when the bus or trolley coach is travelling through a tunnel or subway, the automatic steering mechanism may be lowered to its functioning position to thereby guide the coach or trolley through the subway or tunnel.

Still another object of the invention is to provide a steering mechanism that may be readily applied to the forward axle of a trolley coach or bus, which mechanism will cooperate with a guide track (positioned centrally of the tunnel or subway) and which mechanism may be readily raised when the bus or trolley comes out of the tunnel or subway so that the operator can again take over the steering of the vehicle.

Still another object of the invention is to provide an automatic steering mechanism that may be quickly placed in an operative position and just as quickly raised to an inoperative position so that if the trolley or bus has to run through a narrow tunnel or subway, the steering will not depend on the driver, but the coach will be automatically guided throughout the tunnel or subway.

Still another object of the invention is to provide an automatic steering mechanism that may be readily lowered into position and will be locked in this position until released by the driver so that there is no danger of the automatic steering mechanism jouncing or getting out of position.

With these and other objects in view, the invention consists in new and novel arrangements and combination of parts as will be hereinafter more fully described and pointed out in the claims.

Referring now to the drawings showing a preferred form and one modification:

Fig. 1 is a fragmentary top plan of the forward part of a chassis of a bus together with the automatic steering mechanism lowered to its automatic position;

Fig. 2 is a sectional view taken on line 2—2 of Fig. 1;

Fig. 3 is a fragmentary front view showing the guiding wheels in position;

Fig. 4 is a view similar to Fig. 1 but showing a slight modified form of automatic steering mechanism;

Fig. 5 is a sectional view taken on line 5—5 of Fig. 4;

Fig. 6 is a fragmentary detailed part of the steering mechanism, parts being in section and parts being broken away for the purpose of illustration; and Fig. 7 is an enlarged sectional view taken on line 7—7 of Fig. 6.

Referring now to the several views and to Figs. 1 and 3 for the moment, there is shown in outline, a tunnel or subway 1, while centrally of the same is a concrete or metal guide rail 2 which it will be understood will continue centrally throughout the length of the subway or tunnel, it being always parallel to the sides of the tunnel.

There may also be noticed a front axle 3 which is part of a chassis of a bus or trolley coach, and it will be understood throughout the specification wherein a bus is mentioned, it also includes a trolley coach or any other similar vehicle.

Conventionally mounted are the two front wheels 4, and connected with the stub axles 5 on which these wheels are mounted are the radius arms 6 which are in turn connected to the tie rod 7. Thus, a transverse movement of the tie rod 7 will affect the two front wheels of the vehicle. Connected to this rod 7 may be seen the forward end of an arm 8 which will be connected to the conventional steering wheel (not shown).

Mounted on the axle 3 are the two universal joints 9 and 10, and extending from these universal joints are the respective rods 11 and 12 which, in turn, are connected at their outer ends to the cross-bar 13. Near the opposite ends of the crossbar 13 are the two vertical axles 14 and 15 with the small respective guide wheels 16 and 17.

It will be noticed that the crossbar 13 extends over the guide rail 2 and the vertical axles 14 and 15 straddle the guide rail 2, while the wheels 16 and 17 on the vertical axles freely contact with the opposite sides of this guide rail 2.

It will also be noticed that the tie rod 7 is provided with two sets of ears 18 and 19, and between these respective sets of ears fit the rods 11 and 12. Thus, when the wheels 16 and 17 impinge or contact with the opposite sides of the guide rail 2, they will hold the wheels 4 parallel with the sides of the tunnel or subway, or in other words properly guide the vehicle.

Should there be a curve in the tunnel, of course, the guide rail will also curve and any transverse movement of the guide wheels 16 and 17 will be directed to the tie rod 7 to in turn move or steer the front wheels 4. Thus, when the guide wheels 16 and 17 are in contact with the opposite sides of the guide rail 2, the driver of the vehicle does not have to steer the vehicle but the vehicle will be automatically controlled by this guide rail and the steering mechanism cooperating with the guide rail.

To prevent the rods 11 and 12 and their guide wheels 16 and 17 from accidently swinging upwardly, I provide a crossbar 20 which is pivotally supported as at 21 (see Fig. 2) to the bottom of the coach 23 by the two arms 24. Thus, when the crossbar 20 is in the position shown in Fig. 2, there is no possibility of the guide arms 11 and 12 and the wheels 16 and 17 swinging upwardly away from the guide rail 2. However, when the trolley or bus is running along the highway and the automatic steering mechanism is not functioning, the same may be raised to an elevated position as shown by dotted lines in Fig. 2.

One way of accomplishing this is to provide a pulley 24 over which a chain 25 is passed, one end 26 of the chain 25 being connected to the bar 13, there being a little slack provided in the chain, while to the arms 24 is connected another chain 27, which is also connected to the chain 25.

Thus, when the chain 25 is pulled, the chain 27 being without slack, the arms 24 will be first elevated to move the bar 20 and as soon as the slack is taken out of the chain 26, of course, the rods 11 and 12, with the axles 14 and 15 and their wheels 16 and 17, will be elevated as also shown in Fig. 2. In other words, a movement of the chain 25 will first release the bar 20 so that the guide wheels 16 and 17 may be elevated.

To lower the automatic steering mechanism into place, it is only necessary to lower the chain 25 which will permit the axles 14 and 15 with their wheels to drop and the bar 20 will again swing back into its locking position.

Thus, it will be seen that the bus when on the highways may be steered in the ordinary manner but when approaching a tunnel or subway which has been provided with a central guide rail, the steering mechanism will first be lowered so that these guide wheels straddle the guide rail and the bus may then proceed and be automatically steered until the operator again raises the automatic steering mechanism into its non-functioning position.

Referring now to the modified form shown in Figs. 4 to 7 inclusive, substantially the same arrangement is carried out, but in this instance rather than lowering and raising the rods that extend from the main axle to operate the automatic steering, just the vertical axles and their guide wheels are raised and lowered.

Referring more specifically to the several views, and for the moment to Fig. 4, there will be seen the guide rail 50, the main axle 51 of a bus, and the two wheels 52, also, the tie rod 53 and the radius arms 54 connected thereto. There also may be seen the two arms 55 and 56 that are respectively pivoted at their inner ends to the axle 51, while connecting their outer ends is pivotally secured the cross member 57 which cross member, as may be seen in Fig. 6, may consist of the rod 58 with the reduced ends 59, on the ends of which are mounted the blocks 60 and held in place by the pins 61.

On the rod 58 is a sleeve 62 from which extend the two vertically opposite axles 63 on which are mounted the respective guide wheels 64.

Secured to each block 60 and extending inwardly behind the axle 63 are the stops 65. Also, connected to the sleeve 62 is the arm 66 to which a chain 67 is connected so that when this chain 67 which is controlled from the driver's seat is tightened, it, pulling on the arm 66, will revolve the sleeve and swing the axles 63 with their guide wheels 64 to a non-functioning position.

When the chain 67 is loosened, the axles 63 will assume the vertical position and the wheels will impinge on the opposite sides of the guide rail 50 to automatically steer the vehicle. The stops 65 will prevent the vertical axles from swinging too far rearward.

From the foregoing it will be seen that I have provided an automatic steering mechanism for trolley coaches and the like wherein a guide rail and the steering mechanism will keep the coach or vehicle centrally of the tunnel or subway, but any curve or turn in the guide rail will automatically steer the vehicle to correspond with the curve in the guide rail.

Furthermore, the automatic steering mechanism may be quickly lowered to operative position and may be as quickly raised to an inoperative position.

It will be understood that other means may be used for raising and lowering the automatic steering mechanism and that shown is simply illustrative of a preferred and modified form.

Many slight changes may be made without departing in any way from the spirit and scope of the invention.

Having thus described my invention what I claim is new and desire to secure by Letters Patent is:

1. In an automatic steering mechanism for motor buses and the like, a front axle, stub axles pivoted thereon, front wheels mounted on said stub axles, a tie rod connected with said stub axles, forwardly extending arms connected in a universal manner to the front axle and operably engaging the tie rod, a front crossbar pivotally connected to said last mentioned arms and vertical axles mounted in said crossbar with guide wheels on the lower ends, said guide wheels adapted to straddle a guide rail whereby any lateral movement of the guide wheels will be transferred to the tie rod, stub axles and the front wheels, and manually operated means for elevating the vertical axles and guide wheels from an operative position.

2. In an automatic steering mechanism for motor buses and the like including a front axle, stub axles pivoted thereon, front wheels mounted on said stub axles, a tie rod connected with said stub axles; together with forwardly extending arms pivoted to the front axle, stops on the tie rod and the arms fitting within the said stops, a front crossbar pivotally connected to said last mentioned arms and vertical axles mounted in said crossbar with guide wheels on their lower ends, said guide wheels adapted to straddle a guide rail whereby any lateral movement of the guide wheels will be transferred to the tie rod, stub axles and the front wheels, and means for locking and unlocking the said forwardly extending arms within the stops on the tie rod.

3. In an automatic steering mechanism for motor buses and the like including a front axle, stub axles pivoted thereon front wheels mounted on said stub axles, a tie rod connected with said stub axles; together with forwardly extending arms pivoted to the front axle and fitting within stops on the tie rod, a front crossbar pivotally connected to said last mentioned arms and vertical axles connected in said crossbar with guide wheels on their lower ends, said guide wheels adapted to straddle a guide rail whereby any lateral movement of the guide wheels will be transferred to the tie bar, stub axles and the front wheels, and means for locking and unlocking the said forwardly extending arms within the stops on the tie rod, and means for raising the guide wheels when the extending arms are unlocked with relation to the tie rod.

ORLO A. BARTHOLOMEW.

REFERENCES CITED

The following references are of record in the file of this patent:

UNITED STATES PATENTS

| Number | Name | Date |
|---|---|---|
| 781,146 | Johnson | Jan. 31, 1905 |
| 867,765 | Strickler | Oct. 8, 1907 |
| 927,517 | Fageol | July 13, 1909 |
| 933,914 | Neville | Sept. 14, 1909 |
| 958,160 | Neville | May 17, 1910 |
| 1,446,784 | Carter | Feb. 27, 1923 |
| 1,972,333 | Fageol | Sept. 4, 1934 |

FOREIGN PATENTS

| Number | Country | Date |
|---|---|---|
| 102,385 | Great Britain | Nov. 24, 1915 |
| 207,633 | Switzerland | Feb. 16, 1940 |
| 299,756 | Great Britain | Oct. 30, 1928 |
| 736,602 | France | Sept. 20, 1932 |